INVENTOR
George H. BESSETTE
ATTORNEYS

Jan. 19, 1965   G. H. BESSETTE   3,166,045
CONSTANT ANGLE ADJUSTABLE YOKE FOR STALL DIVISIONS
Filed April 19, 1963   2 Sheets-Sheet 2
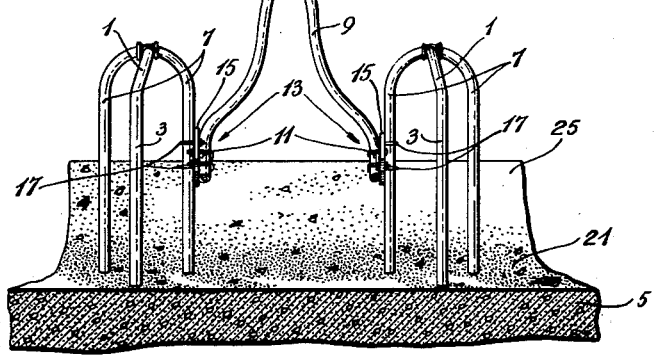
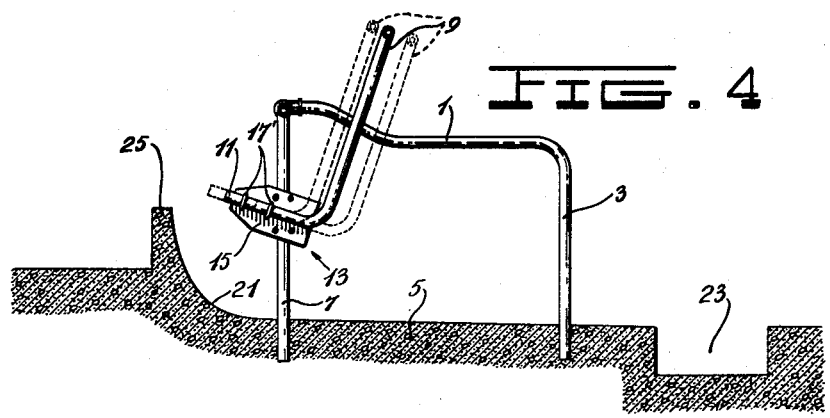
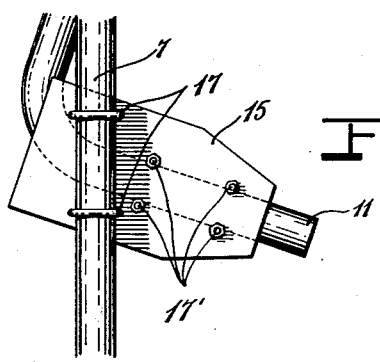
INVENTOR
George H. BESSETTE
BY
ATTORNEYS

United States Patent Office 3,166,045
Patented Jan. 19, 1965

3,166,045
CONSTANT ANGLE ADJUSTABLE YOKE FOR STALL DIVISIONS
Georges Henri Bessette, Rte. 2, Iberville, Quebec, Canada
Filed Apr. 19, 1963, Ser. No. 274,084
3 Claims. (Cl. 119—27)

The instant invention relates to improvements in animal stalls and more particularly to a constant angle adjustable yoke for cow stalls for dairy barns, milking parlors and the like wherein an adjustable yoke is mounted on the front part of a fixed framework so as to restrain the animal in proper position between the feed trough and the litter trough.

It is well-known that cows of different breeds vary in size and also that cows of the same breed but of different ages are of different sizes. This change in size of the cows in a dairy herd causes a certain problem as it requires suitable adjustment of the stanchion or restraining element in a stall in order to permit comfortable positioning of the cow for the milking and feeding operations while permitting the necessary freedom of motion for comfort.

Adjustable restraining stanchions or yokes have been provided and are on the market for this purpose and are made easily and quickly adjustable to accommodate animals of various heights and, to a certain extent, of different lengths. However, the stanchion or restraining element in such devices of the prior art, although adjustable as to height and pivotable at the base so as to take care of changes in height of different animals or of the same animal as it grows older, have practically no provisions for adjustability as to changes in length. The result is that as the cow grows longer or as different animals are successively located in the same stall, the restraining yoke cannot be made to fit all sizes so that certain animals will consistently injure themselves on the shoulder bones or withers as they move from lying to upright positions. The result is that after several blows of this nature, that part of the body becomes very sensitive and the cow will usually decide to remain in the lying position and it may be extremely difficult to induce it to change that position thereafter. This stubbornness on the part of the animal may remain even if it is to the point of starvation.

This is due to the fact that the animal's shoulder bones are rearwardly inclined and retain the same angularity during its growing period and for the rest of its life. The angularity is also substantially the same from one animal to another. With today's stanchions or restraining yokes that are only pivotable at the base, the plane of the yoke, as its position is changed, does not retain the same angularity so that it can rest flatly on the animal's shoulder bones in only one position: in other positions it rests on a very limited area only thus increasing the pressure and eventually causing injury to the animal.

A first and main object of the invention is therefore to provide a yoke that may be displaced to a series of parallel positions.

Another object of the invention is to overcome the above-mentioned disadvantages by providing a stall for such animals as cows which will be used with a restraining element or yoke adjustable both as to height and as to lateral displacement in relation to the supporting rails of the stanchion or yoke.

A further objective of the invention resides in the provision of a relatively simple, effective, easily and quickly operable support element for adjustably supporting the restraining or stanchion element of the improved cow stalls in a fixed adjustable position.

The above mentioned objects may be obtained with the combination according to the invention which comprises: two spaced parallel upright posts secured to a base and disposed in a generally vertical plane; a restraining element formed of a restraining part, adapted to be inclined in relation to said vertical plane at an angle corresponding generally to the inclination of the animal's shoulder bones, and a straight supporting member at each lower end of said restraining part; said members extending perpendicularly of said inclined plane; a bracket for each post on which said restraining element is mounted; first means, on said bracket, to secure said restraining element at selective levels on said post; second means, on said bracket, for slidably receiving and guiding said straight supporting members to allow displacement along the longitudinal axis thereof whereby said restraining part may occupy anyone of a series of parallel positions while retaining the said angle, relative to said vertical plane, corresponding to the inclination of the animal's shoulder bones; said second means including releasable locking means whereby said retaining element may be fixed in one of said parallel positions.

Further objects and other advantages of the invention will become apparent as the following description proceeds, of a stall made according to the invention, reference being had to the accompanying drawings wherein:

FIGURE 3 is a rear-view of a stall made according to the invention with the stanchion adjustable support means removed;

FIGURE 4 is a view similar to that of FIGURE 2, illustrating the stanchion or restraining element as used in reverse position;

FIGURE 5 illustrates, in an enlarged scale the adjustable supporting means.

Figure 1:
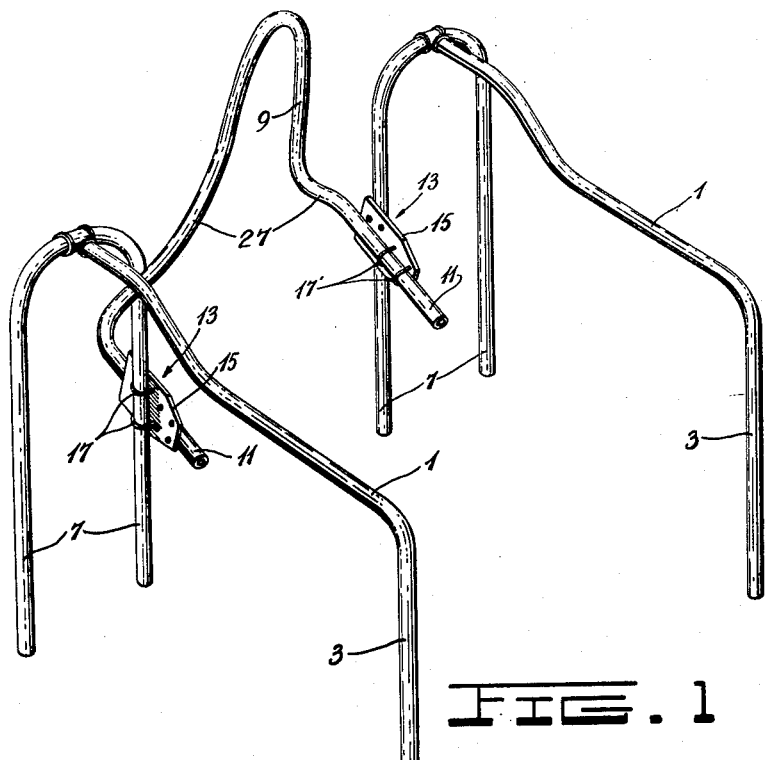
FIGURE 1 is a perspective illustration of the stall made according to the invention.

FIGURE 1 illustrates the complete assembly which is composed of two identical laterally spaced parallel partition rails formed of a horizontal portion 1 and rearward portion 3 adapted to be embedded in a concrete base 5. The front portion of the stall is made up of two upright posts 7 joined together at one end in the form of a U, the other end being anchored in the concrete base 5.

The stanchion or restraining element or yoke 9 is generally of inverted V-shape and is formed with two supporting portions 11 that extend in parallel relationship and generally normally of the plane containing the restraining yoke 9 proper. The adjustable clamp-type support means 13 that serves to hold the restraining element or yoke against the post 7 is composed of a generally flat plate 15 and a series of U-shaped clamps 17, 17'. One set of clamps 17 serves to secure and lock plate 15 in any desired vertical position along posts 7 whereas the other set 17' serves to receive the supporting portions of restraining yoke 9 in sliding relation on plate 13. The clamping of elements 17, 17' is obtained in the usual manner by having the clamps threaded at their free ends and tightened against plate 15 by bolts 19.

Figure 2:
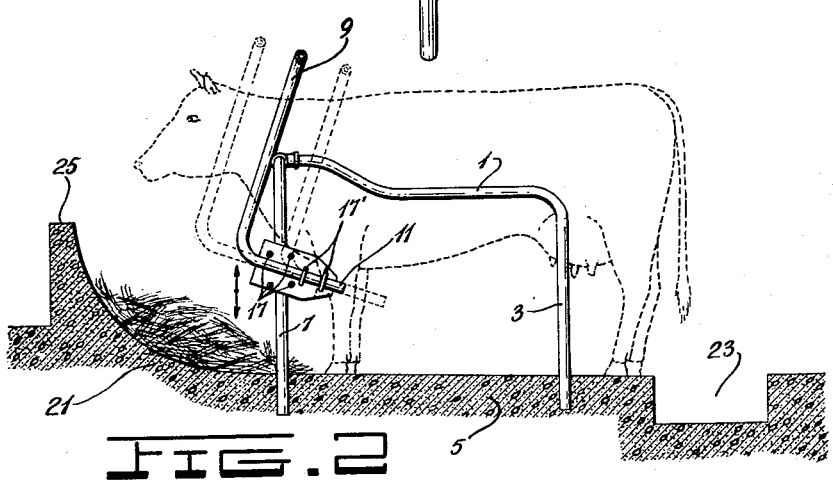
FIGURE 2 is a side-elevation view of the stall of the invention, the stanchion or restraining element being shown in various positions.

The positioning of the aforedescribed structure is illustrated in FIGURE 2 where the post 7 and rear portions 3 are located adjacent the manger trough 21 and the litter trough 23, respectively. A transverse curb 25 may also be provided to retain the cow feed in the manger trough.

FIGURE 2 particularly illustrates the important improvement of the invention wherein the restraining element or yoke 9 is made displaceable in various parallel positions with the supporting portions 11 thereof being displaced to and away from the plane containing the vertical post 7. With such an arrangement it is therefore possible, as the animal grows bigger, or if animals of other sizes are to be located in the stalls, to adjust this yoke in accordance with their size. In previous devices of this type, although the yoke was adjustable vertically to account for increase or decrease in height, it was only pivotable at the base thereof so that the portion of the yoke adjacent the supporting means, such as 13, was always in the same lateral position. As the cow grew bigger and the shoulder blades projected more and more forwardly, the animal would hurt itself against the corresponding curved portions such as shown at 27 in FIGURE 1. This is no longer possible with the yoke of the invention since the latter can be made to move in various parallel positions and consequently retain the same angle at all times as well illustrated in FIGURE 2.

For much smaller animals it may be found advantageous and convenient to revert to the arrangement shown in FIGURE 4, where the yoke is actually used in reversed position. If the animal outgrows the stall or if a bigger animal is to use the stall, the restraining element may again be placed as in the other figures.

Although a specific embodiment of the invention has just been described, it is to be understood that the example given is by no means to be construed as restricting or limiting the scope of the invention which should only be derived from the appended claims.

I claim:

1. In an animal stall construction, the combination comprising:
   (a) two spaced parallel upright posts secured to a base and disposed in a generally vertical plane;
   (b) a restraining element formed of a restraining part, inclined in relation to said vertical plane an angle corresponding generally to the inclination of the animal's shoulder bones, and a straight supporting member at each lower end of said restraining part; said members extending perpendicularly of said inclined restraining part;
   (c) a bracket on each post for mounting said restraining element;
   (d) first means, on said brackets, to secure said restraining element at selective levels on said posts;
   (e) second means, on said brackets defining a passage inclined at said angle, for slidably receiving and guiding said straight supporting members to allow displacement along the longitudinal axes of the members whereby said restraining part may be displaced along an inclined relative to said vertical plane to occupy anyone of a series of parallel positions while retaining the said angle, relative to said vertical plane, corresponding to the inclination of the animal's shoulder bones;
   (f) said second means including releasable locking means whereby said restraining element may be fixed in one of said parallel positions.

2. A combination as claimed in claim 1, wherein said second means consists of U-shaped clamps surrounding each of said supporting members and wherein said locking means are nuts for holding the members against the brackets.

3. An animal stall as claimed in claim 1, wherein said first means consists of U-shaped clamps surrounding each of said posts and nuts for said clamps, for releasably securing said brackets against said posts and said second means for further U-shaped clamps surrounding each supporting member and said locking means are nuts for clamping said members against the brackets.

References Cited by the Examiner

UNITED STATES PATENTS

| 2,578,093 | 12/51 | Schillinger | 119—147 |
| 2,779,312 | 1/57 | Girton | 119—147 |

FOREIGN PATENTS 138,757  1/53  Sweden.

SAMUEL KOREN, *Primary Examiner.*

HUGH R. CHAMBLEE, *Examiner.*